United States Patent
Ohanian

(10) Patent No.: US 6,997,329 B2
(45) Date of Patent: Feb. 14, 2006

(54) CONTAINER LID RACK

(76) Inventor: Garabet Nemer Ohanian, P. O. Box 13265, Keifan (KW) 71953

( * ) Notice: Subject to any disclaimer, the term of this patent is extended or adjusted under 35 U.S.C. 154(b) by 61 days.

(21) Appl. No.: 10/463,234

(22) Filed: Jun. 16, 2003

(65) Prior Publication Data
US 2004/0251222 A1  Dec. 16, 2004

(51) Int. Cl.
*A47F 5/08* (2006.01)
(52) U.S. Cl. .................. 211/41.11; 211/181.1
(58) Field of Classification Search ............. 211/41.11, 211/181.1, 41.1–41.4, 74, 70.7, 85.18, 85.26, 211/85.31; 248/37.3; D7/637, 638; D6/566
See application file for complete search history.

(56) References Cited
U.S. PATENT DOCUMENTS

| | | | |
|---|---|---|---|
| 887,972 A * | 5/1908 | Sloan ................. 211/106 |
| 941,653 A | 11/1909 | Rothengatter |
| 1,065,000 A | 6/1913 | Sarter et al. |
| 1,528,744 A | 3/1925 | Dix |
| 1,842,118 A * | 1/1932 | Resnik et al. ............ 211/41.11 |
| 1,986,486 A | 1/1935 | Swanson |
| D167,483 S * | 8/1952 | Russo .................. D6/464 |
| 2,633,994 A * | 4/1953 | Brown ................ 211/41.11 |
| 2,728,520 A * | 12/1955 | Moyle .................. 235/22 |
| 2,934,210 A | 4/1960 | Jordan |
| 2,951,590 A * | 9/1960 | Feser ................... 211/75 |
| 2,972,414 A | 2/1961 | Sipe |
| 3,028,972 A * | 4/1962 | Guillaumant ........... 211/41.11 |
| 3,094,215 A | 6/1963 | Sipe |
| 3,175,694 A * | 3/1965 | Reibold et al. ........... 211/60.1 |
| 3,900,109 A * | 8/1975 | Peterson ............... 211/70.6 |
| 4,632,259 A * | 12/1986 | Cameron ............... 211/119 |
| 4,673,089 A * | 6/1987 | Chap ................. 211/41.2 |
| D297,489 S | 9/1988 | Chap et al. |
| D311,651 S | 10/1990 | Fetty |
| 4,961,555 A * | 10/1990 | Egan, Jr. .............. 248/231.81 |
| 4,998,627 A | 3/1991 | Elder |
| 5,503,062 A * | 4/1996 | Buff, IV .............. 99/426 |
| 5,810,308 A | 9/1998 | Lam |
| 6,012,593 A | 1/2000 | Knittel et al. |
| 2003/0213759 A1 * | 11/2003 | Compagnucci .......... 211/41.11 |

* cited by examiner

*Primary Examiner*—Jennifer E. Novosad
(74) *Attorney, Agent, or Firm*—Streets & Steele; Frank J. Campigot

(57) ABSTRACT

A substantially W-shaped rack having four legs, each of which is preferably a wire or rod member formed of a single, elongated, bent rod or a plurality of connected rods. It is preferred that each of the legs has substantially the same length. The shape of the rack results in angles being formed between adjacent legs, and it is preferred that these angles do not exceed 45 degrees.

48 Claims, 7 Drawing Sheets

CONTAINER LID RACK

BACKGROUND OF THE INVENTION

1. Field of the Invention

The present invention relates to frames and racks for holding articles, and, more particularly, to racks for supporting container lids such as lids for cooking pots.

2. Background of the Related Art

Cooking and preparing food on a stove top commonly requires the use of cylindrical or similar containers called pots having complementary lids. It is typical for the lids to be moved on and off the pots while cooking to check and stir the food in the pots, and well as add certain ingredients to the food as it is being cooked. When the lids are removed for more than a few seconds, they are often laid handle-side up on the stove top or adjacent counter top causing sauce or other liquids such as condensate collected on the lid to drip onto the stove top or counter top. It is therefore desirable to temporarily store or support the lids so that they don't drip and are out of the way while cooking.

Several lid storage racks are disclosed in the following U.S. Patents: U.S. Pat. No. 941,653 to Rothengatter; U.S. Pat. No. 1,065,000 to Sarter et al.; U.S. Pat. No. 1,528,744 to Dix; U.S. Pat. No. 1,986,486 to Swanson; U.S. Pat. No. 2,934,210 to Jordan; U.S. Pat. No. 2,972,414 to Sipe; U.S. Pat. No. 3,094,215 to Sipe; U.S. Pat. No. 4,998,627 to Elder; U.S. Pat. No. 5,810,308 to Lam; and U.S. Pat. No. 6,012,593 to Knittel et al.

The '653 patent by Rothengatter discloses a foldable rack for supporting a number of cooking pot lids. The rack has a stem carrying a plurality of spaced clasps that may be folded upright or swung downwardly for supporting lids at an angle from the stem. Each clasp is a single piece of wire bent to form a transverse rear arm and a pair of opposing side loops giving the clasp a width approximately twice as great as its depth from the stem. This requires that the lids be positively engaged under the transverse rear arm because the depth of the clasp is not sufficient to otherwise support the lids, particularly as the diameter of the lids increases. Furthermore, the disclosure only illustrates the lids being stowed in a handle-up position, which would permit sauces and liquids collected on the underside of the lid to drip onto a stove top or counter top.

The '000 patent by Sarter et al., the '744 patent by Dix, the '486 patent by Swanson, and the '210 patent by Jordan each disclose various bent-wire racks for supporting a plurality of cooking pot lids. Each of the disclosed racks supports the lids in substantially vertical or steeply inclined positions, permitting sauces or liquids collected on the underside of the lids to drip down onto the stove top or counter top when the lids are stored in these racks.

The rack of the '000 patent includes a large inclined base making the rack suitable for draining water from the supported lids after washing them, but is not suitable for use while cooking.

The rack of the '210 patent includes a drip tray for collecting drippings from stored lids as well as for storing cooking utensils. The rack employs elongated outer legs that support a shortened V-shaped bend defining a recess to support smaller lids by their handles. Larger lids, however, are supported by spaced transverse rods, permitting the supported lids to slide down and splatter drippings outside the drip tray.

The '414 and '215 patents by Sipe disclose other racks for storing a plurality of cooking pot lids. The disclosed racks employ a plurality of narrow, vertically-spaced loops extending from a supporting element to support the lids in an inverted (handle-down) position. The narrowness of the loops makes the loops unsuitable for storing large diameter lids because the lids will be prone to tip to one side and fall from the loops, particularly if the lids have small handles that don't fully engage the sides of the loops.

The '627 patent by Elder discloses another lid holder rack that employs various alternative structures such as a forward support bar with V-shaped notches and a bent wire frame body. Each the disclosed embodiments relies substantially on the geometry of the lid handle to ensure positive engagement with the rack, thereby rendering the disclosed racks unsuitable for certain large diameter lids having relatively small handles.

The '308 patent to Lam and the '593 patent to Knittel et al. disclose other lid storage racks, each of which also store lids in a substantially vertical or steeply inclined position, permitting sauces or liquids collected on the underside of the lids to drip down onto the stove top or counter top when the lids are stored in these racks while cooking. The '593 patent includes a base, presumably to catch drippings from the stored lids. The base supports three different-sized vertical lid supports and four retainers intermediate the lid supports. This configuration requires that the base be relatively broad and take up a considerable amount of surface area on a stove top or counter top when used while cooking.

It is therefore desirable to provide a rack for coking pot lids that supports the lids in an inverted position to prevent cooking fluids from dripping from the underside of the stored lids.

It is further desirable to provide such a rack that reliably supports a lid or a plurality of lids of varying diameters.

It is further desirable to provide such a rack that reliably supports a lid or a plurality of lids independently of the size or geometry of the lid handles.

It is still further desirable to provide such a rack that requires little or no surface area on a kitchen counter top or stove top.

SUMMARY OF THE INVENTION

One embodiment of the present invention employs a substantially W-shaped rack for holding a container lid, such as the lid for a cooking pot. The rack has four legs, each of which is preferably a wire or rod-like member and each having substantially the same length. The shape of the rack results in angles being formed between adjacent legs, and it is preferred that these angles do not exceed 45 degrees.

The W-shaped rack may be formed from a single rod bent to form the legs, such as a metal rod, or it may be formed from a molded rod, such as a rod that includes a plastic material. The term "rod" is used herein to mean a slender member, including but not limited to, a bar, a stick, and a wire.

The W-shaped rack may also be formed of a plurality of rods connected to form the legs. In the case where the rods are metal, they may be connected by welding.

The connections between the legs may be angular or defined by smooth curves.

In a particular embodiment of the present invention, at least one of the legs of the W-shaped rack contains a curved section having an angle of curvature that exceeds 180 degrees for holding a container. Preferably, the curved section has an angle of curvature that exceeds 300 degrees. The curved section may be adapted for holding a cup so that cooking utensils such as spoons may be held in the cup, avoiding the dripping of cooking sauces and the like onto a kitchen counter or stove top from the utensils.

The curved section may be affixed to at least one leg, but it may also be integrally formed with the one leg. In either case, it is preferred that the one leg is substantially linear except for the curved section.

It is also preferred that the W-shaped rack includes a means for securing the rack to a wall, such as a kitchen backsplash wall. The securing means includes, in one embodiment, a pair of looped members formed in the rack through which screws may be inserted to mount the rack to the wall. Each of the pair of looped members may be affixed to one of the legs, or, alternatively, each of the pair of looped members may be integrally formed with one of the legs.

It is further preferred that the W-shaped rack include a stand for elevating the rack above a surface. The stand may be affixed to at least one of the legs, or, alternatively, the stand may be integrally formed with at least one of the legs. The stand preferably includes a rod depending perpendicularly from at least one of the legs, and a vertically-supported tube for receiving and supporting the rod. A second rack may be used for vertically supporting the tube.

The present invention may be further characterized as a rack for holding a container lid, including a pair of opposing, substantially linear, elongated inner members each having first and second ends, and a pair of opposing, substantially linear, elongated outer members each having first and second ends. The first ends of the inner members are connected and the second ends of the inner members are spaced apart by a first distance. Each of the second ends of the outer members are connected to the second end of one of the inner members, while the first ends of the outer members are spaced apart by a second distance that exceeds the first distance. It is preferred that the inner and outer members all lie substantially in the same plane.

In one embodiment, the first ends of the inner members of the rack are connected in the form of a curved joint. In this embodiment, it's also preferred that each of the second ends of the outer members be connected to the second end of one of the inner members in the form of a curved joint.

In one embodiment, the inner and outer members each include a separate rod. The inner members, if metal, may be connected at their first ends by a weld joint. Each of the second ends of the outer members may also be connected to the second end of one of the inner members by a weld joint, if the outer members are metal.

In a particular embodiment, at least some of the inner and outer members are formed of a continuous rod having at least one bend therein, and the so-formed inner and outer members are connected by their integration in the continuous rod. It is presently preferred that each of the inner and outer members be formed of a continuous rod having at least three bends therein, and that the so-formed inner and outer members be connected by their integration in the continuous rod. The continuous rod may be metal. The continuous rod may be formed by molding, and for this purpose, may otherwise include a plastic material.

The present invention, as characterized by the inner and outer members, is well adapted for employing the curved section, the wall securing means and the stand as described above for the W-shaped rack.

The present invention may otherwise be characterized as an apparatus for supporting the lid of a cooking pot, including a substantially W-shaped rack having four legs wherein the angles formed between adjacent legs of the W-shaped rack do not exceed 45 degrees.

In one embodiment, the apparatus includes a plurality of substantially W-shaped racks each having four legs, the angles formed between adjacent legs of the W-shaped rack not exceeding 45 degrees. Means, including an adaptive stand, may be provided in this embodiment of the apparatus for connecting the racks in a vertically stacked assembly.

The present invention, as so-characterized, is also well adapted for employing the curved section, the wall securing means and the stand as described above for the W-shaped rack.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1A:
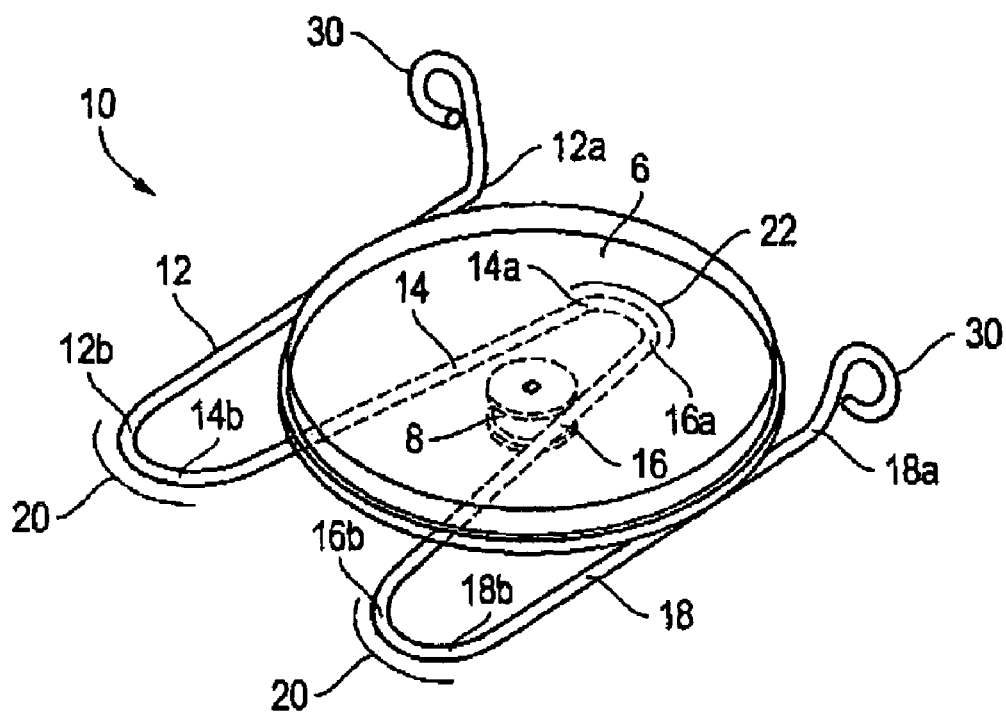
FIGS. 1A–1C are perspective, plan, and elevational views of one embodiment of a rack in accordance with the present invention.
Figure 1B:
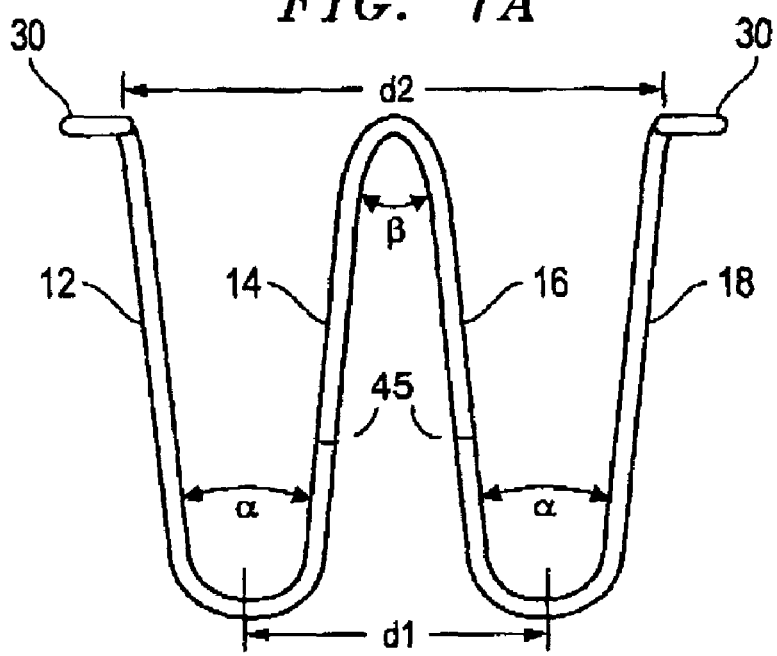
Figure 1C:
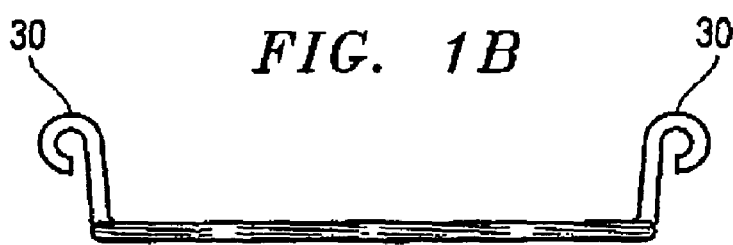

FIGS. 1A–C illustrate one embodiment of the present invention in the form of a W-shaped rack 10 for holding a container lid, such as the lid 6 for a cooking pot. W-shaped rack 10 has four legs 12, 14, 16, and 18, each of which is preferably a rod-like member and each having substantially the same length. The shape of the rack results in angles $\alpha$, $\beta$ being formed between adjacent legs, and it is preferred that these angles do not exceed 45 degrees. The narrowness of such angles, particularly internal angle $\beta$, increases the likelihood of positive engagement between legs 14, 16 and the handle 8 of lid 6.

The W-shaped rack 10 may be formed from a single rod bent to form the legs, such as a metal rod (presently preferred), or it may be formed from a molded rod, such as a rod that otherwise includes a plastic material.

The W-shaped rack may also be formed of a plurality of rods connected to form the legs (not shown). In the case where the rods are metal, they may be connected by welding to form welds 45 (FIG. 1B) or other suitable means.

The connections between the legs may be angular (not shown) or defined by smooth curves, as depicted by curved portions 20 and 22.

Figure 2A:
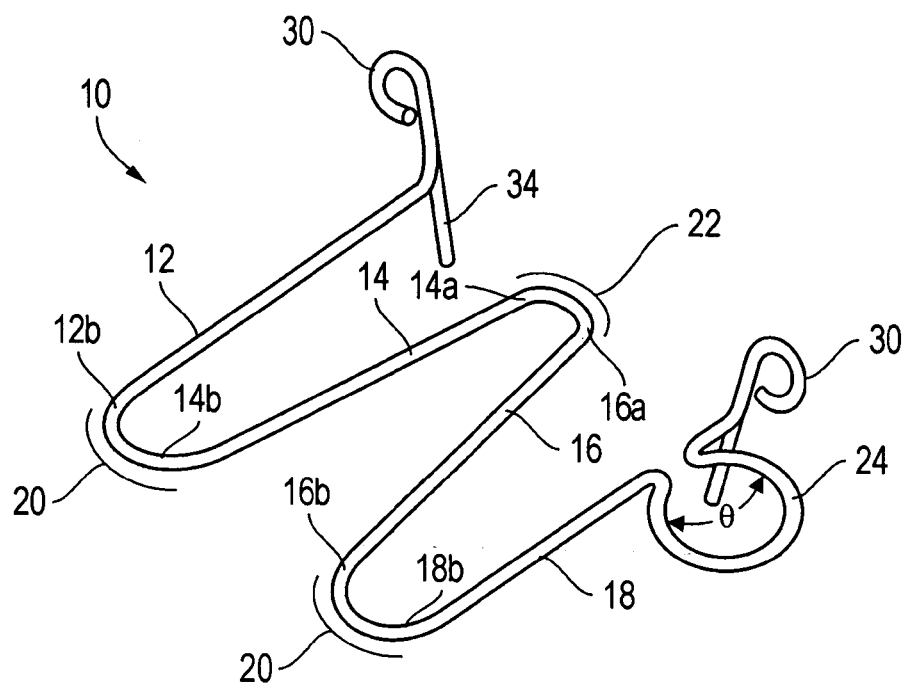
FIGS. 2A–2C are perspective, plan, and elevational views of a second embodiment of a rack in accordance with the present invention.
Figure 2B:
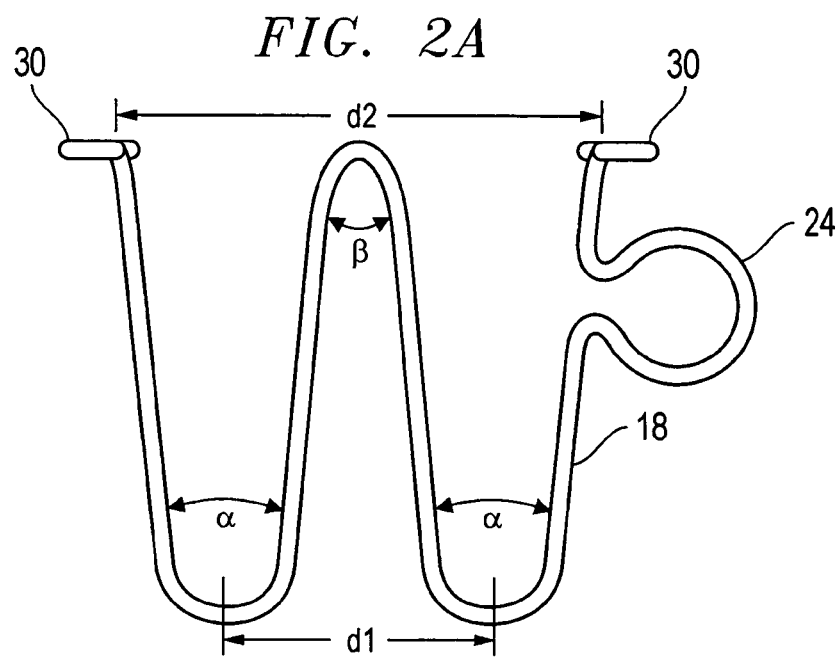
Figure 2C:
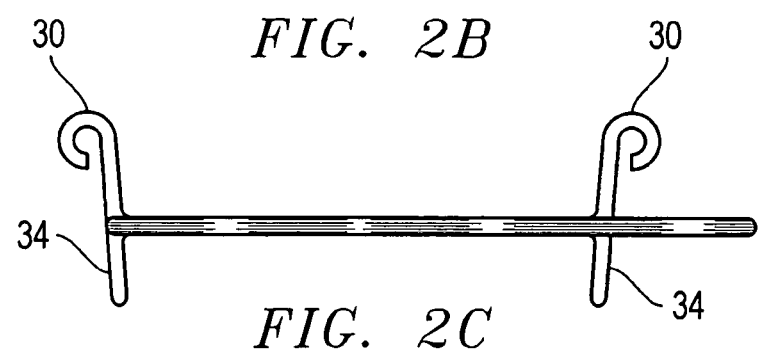
Figure 4:
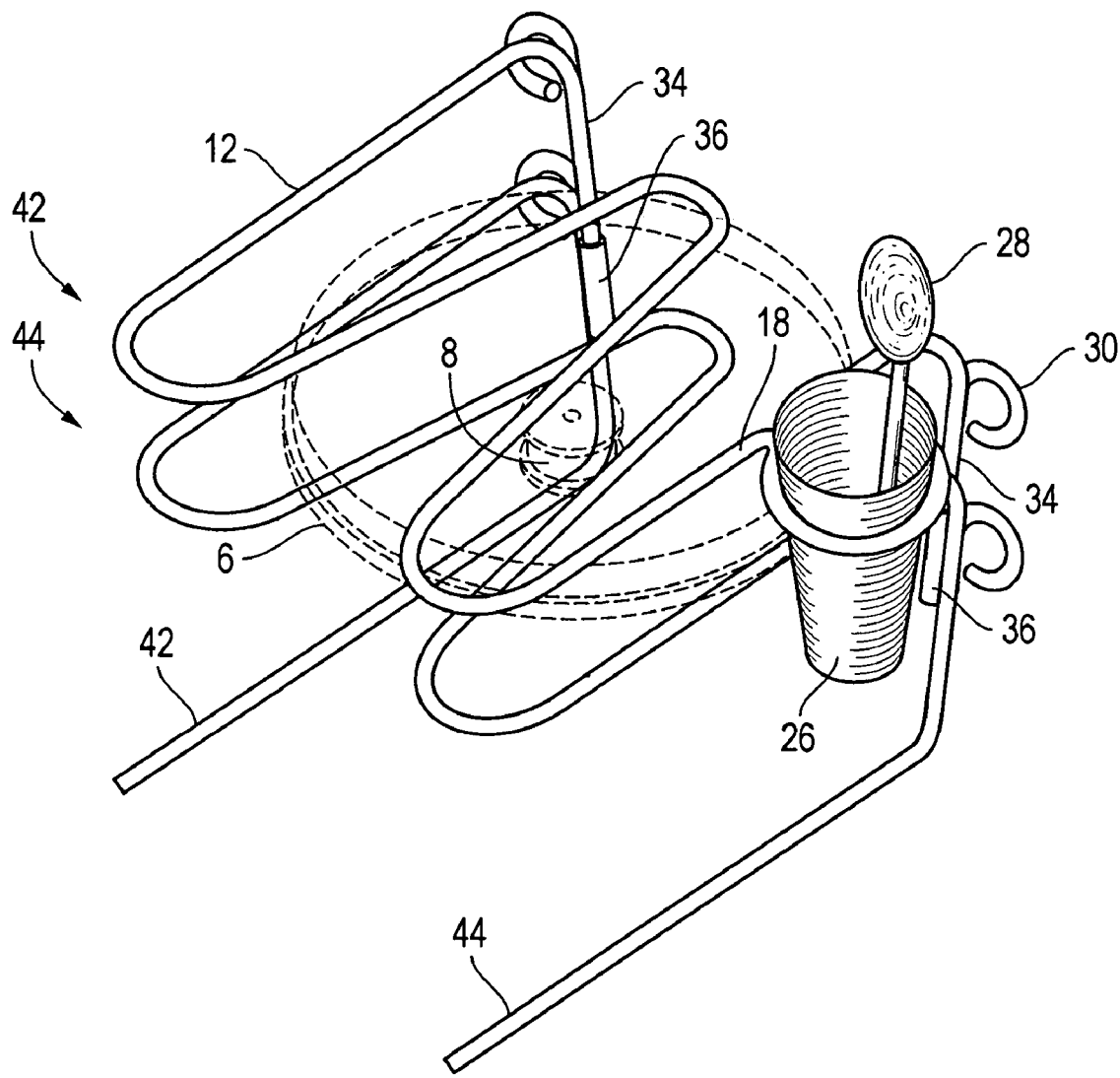
FIG. 4 is a perspective view of a fourth embodiment of a rack in accordance with the present invention, illustrating the ability to stack multiple such racks.
Figure 5:
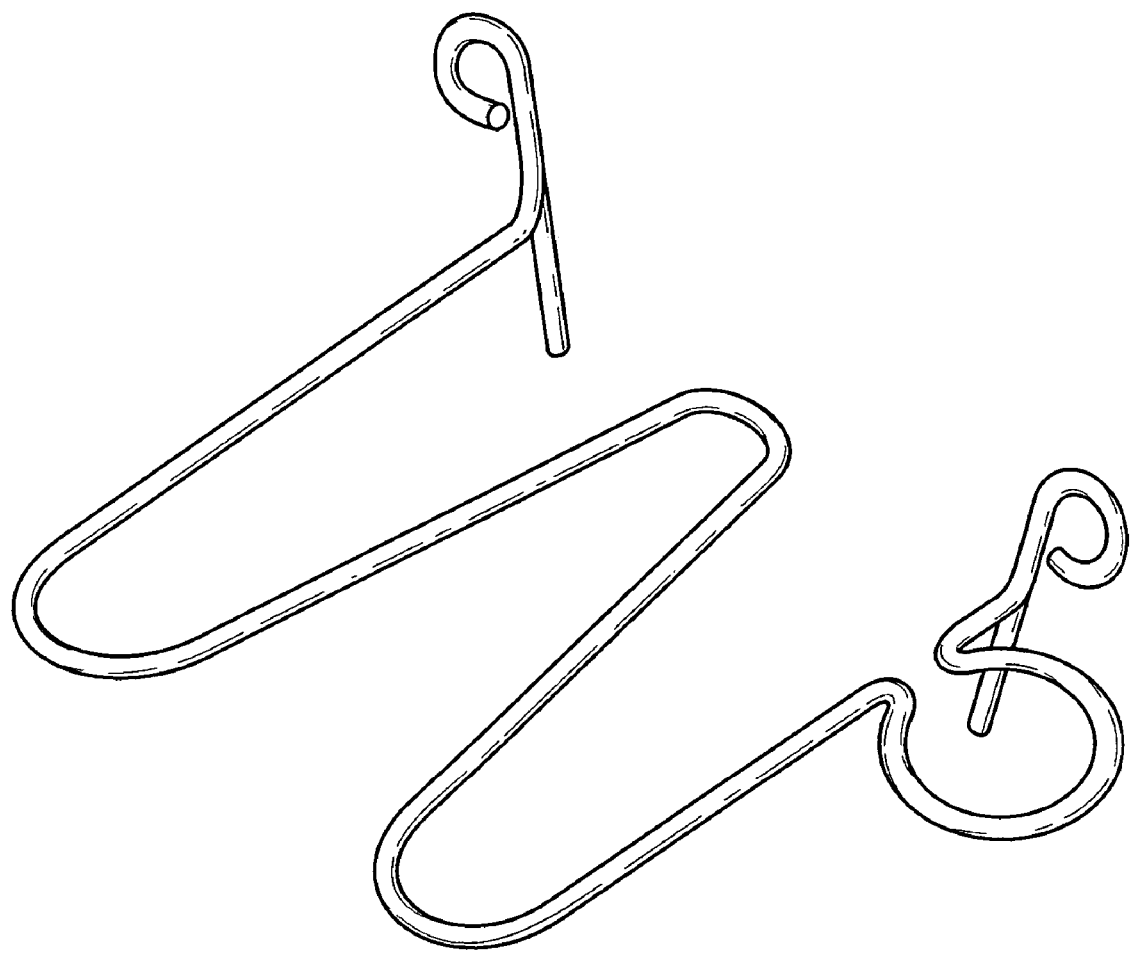
FIG. 5 is a perspective view of the rack embodiment of FIGS. 2A–C particularly showing the rack design.
Figure 6:
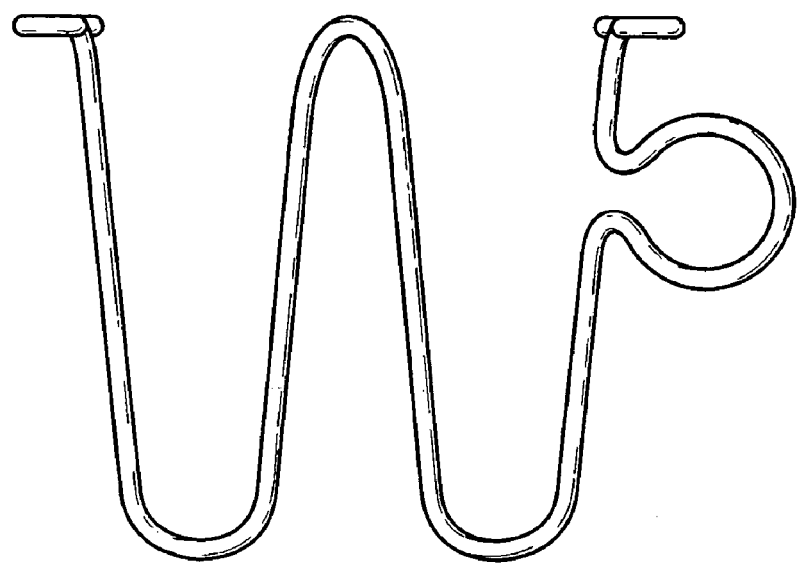
FIGS. 6 and 7 are respective top and bottom plan views of the rack design of FIG. 5.
Figure 7:
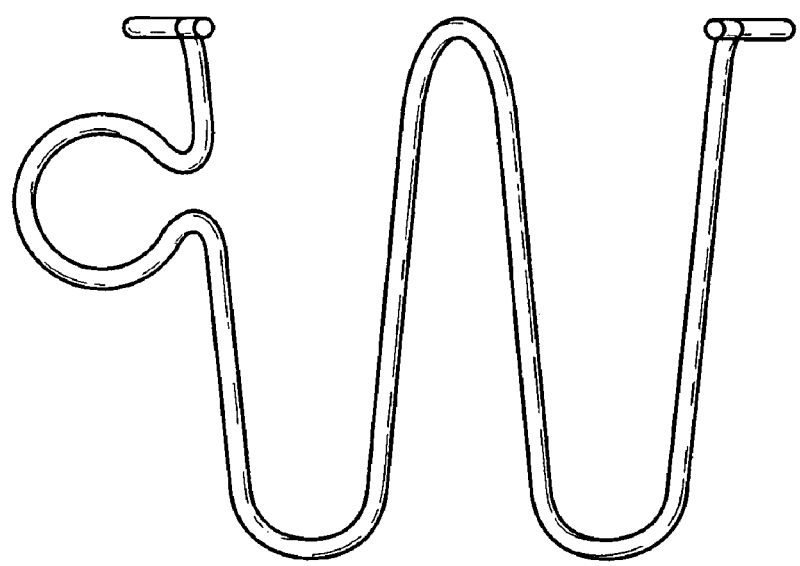
Figure 8:
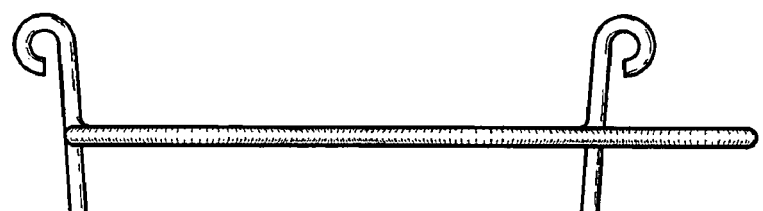
FIGS. 8 and 9 are respective front and back elevational views of the rack design of FIG. 5.
Figure 9:
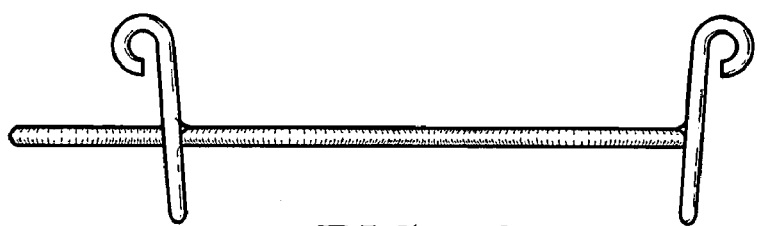
Figure 10:
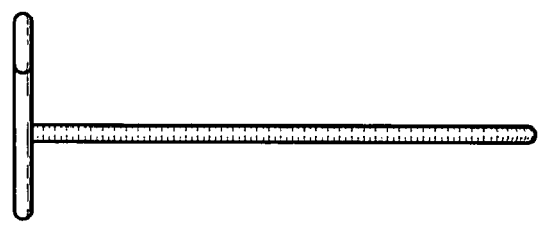
FIGS. 10 and 11 are respective left and right elevational views of the rack design of FIG. 5.
Figure 11:
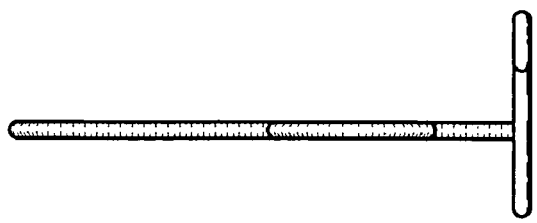

In a particular embodiment of the present invention, shown in FIGS. 2A–C, one of the legs 18 of the W-shaped rack 10 contains a curved section 24 having an angle of curvature θ that exceeds 180 degrees for holding a container. Preferably, the curved section has an angle of curvature that exceeds 300 degrees, as shown in FIGS. 2A–B and FIG. 4. The curved section 24 may be adapted for holding a cup 26 so that cooking utensils such as spoons 28 may be held in the cup, avoiding the dripping of cooking sauces and the like onto a kitchen counter or stove top.

The curved section may be affixed to at least one leg (not shown), but it may also be integrally formed (e.g., by bending) with the one leg 18 as depicted by curved section 24. In either case, it is preferred that the one leg 18 be substantially linear except for the curved section 24, the leg otherwise deviating from a linear shape primarily near its connection 20 with the adjacent leg 16.

It is also preferred that the W-shaped rack 10 includes a means for securing the rack to a wall, such as a kitchen backsplash wall. The securing means includes, in one embodiment, a pair of looped members 30 formed in the rack through which screws (not shown) may be inserted to mount the rack to the wall. Each of the pair of looped members may be affixed to one of the legs (not shown), or, alternatively, each of the pair of looped members may be integrally formed (e.g., by bending) with one of the legs as indicated by looped members 30.

Figure 3:
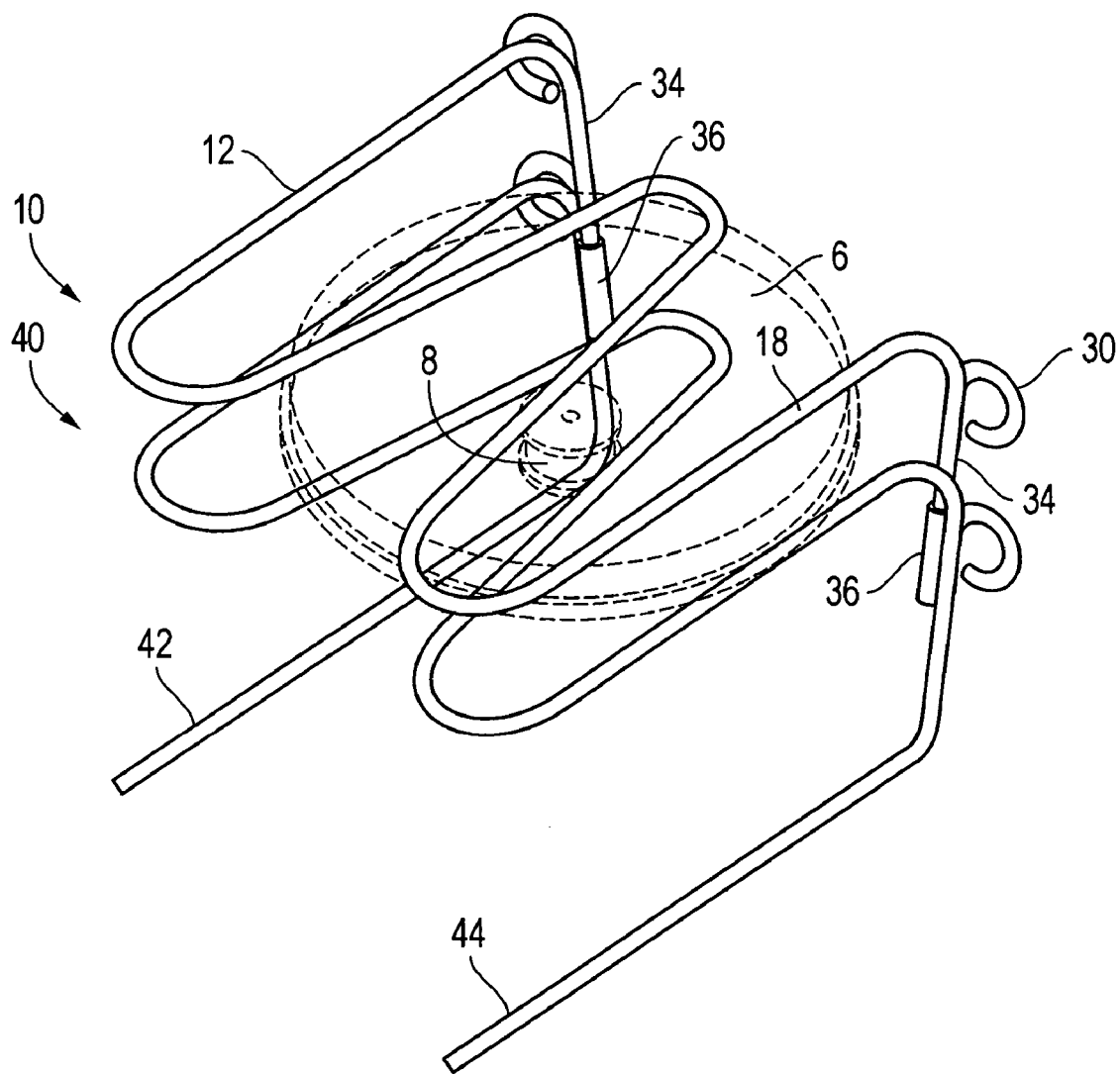
FIG. 3 is a perspective view of a third embodiment of a rack in accordance with the present invention, illustrating the ability to stack multiple such racks.

It is further preferred that the W-shaped rack 10 include a stand for elevating the rack above a surface such as a kitchen counter top. The stand may be affixed to at least one of the legs, or, alternatively, the stand may be integrally formed with at least one of the legs. As shown in FIGS. 3–4, the stand preferably includes at least a rod 34 depending perpendicularly from the legs 12 and 18, and a vertically-supported tube 36 for receiving and supporting the rod 34. A second rack 40 having base legs 42, 44 may be used for vertically supporting the tube 36 as well as supporting a second lid.

With reference once again to FIGS. 1A–C and 2A–C, the present invention may be further characterized as a rack 10 for holding a container lid 6, including a pair of opposing, substantially linear, elongated inner members 14, 16 each having first ends 14a, 16a and second ends 14b, 16b, and a pair of opposing, substantially linear, elongated outer members 12, 18 each having first ends 12a, 18a and second ends 12b, 18b. The first ends 14a, 16a of the inner members 14, 16 are connected via curved section 22 and the second ends 14b, 16b of the inner members are spaced apart by a first distance d1. Each of the second ends 12b, 18b of the outer members 12, 18 are connected to the respective second ends 14b, 16b of the inner members 14, 16. The first ends 12a, 18a of the outer members 12, 18 are spaced apart by a second distance d2 that exceeds the first distance d1. It is preferred that the inner and outer members all lie substantially in the same plane.

It is preferred that the first ends 14a, 16a of the inner members of the rack are connected in the form of a curved joint 22. It is also preferred that each of the second ends 12b, 18b of the outer members 12, 18 be connected to the second ends 14b, 16b of one of the inner members 14, 16 in the form of respective curved joints 20.

In one embodiment, the inner and outer members each include a separate rod (not shown). The inner members, if metal, may be connected at their first ends by a weld joint or other suitable means. Each of the second ends of the outer members may also be connected to the second end of one of the inner members by a weld joint or other suitable means, if the outer members are metal.

In a particular embodiment, at least some of the inner and outer members are formed of a continuous rod having at least one bend therein, and the so-formed inner and outer members are connected by their integration in the continuous rod. It is presently preferred that each of the inner and outer members be formed of a continuous rod having at least three curved bends 20, 22, and 20 therein, as particularly shown in FIGS. 1A–B and 2A–B, and that the so-formed inner and outer members be connected by their integration in the continuous rod. The continuous rod may be metal. The continuous rod may be formed by molding, and for this purpose, may otherwise include a plastic material.

The present invention may otherwise be characterized as an apparatus for supporting the lid 6 of a cooking pot, including a substantially W-shaped rack 10 having four legs 12, 14, 16, and 18 wherein the angles α, β formed between adjacent legs of the W-shaped rack do not exceed 45 degrees.

In one embodiment, the apparatus includes a plurality of similar, substantially W-shaped racks 10 each having four legs, with the angles formed between adjacent legs not exceeding 45 degrees. Means, including an adaptive stand 34, 36 are provided in this embodiment of the apparatus for connecting the racks 10 in a vertically stacked assembly. The lower rack may be equipped with base legs 42, 44 to support the lids 6 at an elevation above a surface without the need to employ looped members 30.

Those skilled in the art having the benefit of this disclosure will appreciate that the present invention is well-suited for supporting one or more lids for cooking pots in inverted positions while cooking to prevent cooking fluids from dripping from the underside of the stored lids. The inventive design makes the rack 10 suitable for lids 6 of many different diameters regardless of the geometry of the handle 8 used with the lid.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A substantially W-shaped rack for holding a container lid, the rack having four legs and being characterized by:
the four legs include two outer legs and two inner legs, the two inner legs joined together at a proximal end of the rack and the outer legs joining adjacent inner legs at a distal end of the rack;
each of the legs of the W-shaped rack are rod members having substantially the same length;
the angles formed between adjacent legs of the W-shaped rack not exceeding 45 degrees, and
supports for securing the rack in a substantially horizontal position to a vertical surface, wherein the supports for securing are at proximal ends of the two outer legs.

2. The rack of claim 1, wherein the W-shaped rack is formed from a single rod bent to form the legs.

3. The rack of claim 2, wherein the rod is metal.

4. The rack of claim 1, wherein the W-shaped rack is formed from a molded rod.

5. The rack of claim 4, wherein the rod includes a plastic material.

6. The rack of claim 1, wherein the W-shaped rack is formed of a plurality of rods connected to form the legs.

7. The rack of claim 6, wherein the rods are metal and are connected by welding.

8. The rack of claim 1, wherein the supports include a pair of looped members.

9. The rack of claim 8, wherein each of the pair of looped members is affixed to one of the legs.

10. The rack of claim 8, wherein each of the pair of looped members is integrally formed with one of the legs.

11. The rack of claim 1, further comprising a stand for elevating the rack above a surface, wherein the stand includes a rod depending perpendicularly from the proximal end of at least one of the legs.

12. The rack of claim 11, wherein the stand is affixed to at least one of the legs.

13. The rack 11, wherein the stand is integrally formed with at least one of the legs.

14. The rack of claim 11, wherein the stand further comprises a vertically-supported tube for receiving and supporting the perpendicular rod.

15. The rack of claim 1, wherein one of the legs contains a curved section having an angle of curvature that exceeds 180 degrees for holding a container.

16. The rack of claim 15, wherein the curved section has an angle of curvature that exceeds 300 degrees.

17. The rack of claim 15, wherein the curved section is affixed to the one leg.

18. The rack of claim 15, wherein the curved section is integrally formed with the one leg.

19. The rack of claim 18, wherein the one leg is substantially linear except for the curved section.

20. A rack for holding a container lid, comprising:
- a pair of opposing, substantially linear, elongated inner members each having first and second ends, the first ends of the inner members being connected and the second ends of the inner members being spaced apart by a first distance;
- a pair of opposing, substantially linear, elongated outer members each having first and second ends, each of the second ends of the outer members being connected to the second end of one of the inner members, and the first ends of the outer members being spaced apart by a second distance that exceeds the first distance; and
- supports for securing the rack in a substantially horizontal position to a vertical surface at a proximal end of the rack, wherein the supports for securing are at the second ends of the two outer members, wherein the inner and outer members all lie substantially in the same plane.

21. The rack of claim 20, wherein the first ends of the inner members are connected in a form of a curved joint.

22. The rack of claim 20, wherein each of the second ends of the outer members is connected to the second end of one of the inner members in a form of a curved joint.

23. The rack of claim 20, wherein the inner members are connected by a weld joint.

24. The rack of claim 20, wherein each of the second ends of the outer members is connected to the second end of one of the inner members by a weld joint.

25. The rack of claim 20, wherein at least some of the inner and outer members are formed of a continuous rod having at least one bend therein, and the so-formed inner and outer members are connected by their integration in the continuous rod.

26. The rack of claim 25, wherein each of the inner and outer members is formed of a continuous rod having at least three bends therein, and the so-formed inner and outer members are connected by their integration in the continuous rod.

27. The rack of claim 25, wherein the rod is metal.

28. The rack of claim 25, wherein the rod is formed by molding.

29. The rack of claim 28, wherein the rod includes a plastic material.

30. The rack of claim 20, wherein each of the inner and outer members includes a separate rod.

31. The rack of claim 30, wherein the rods are metal and are connected by welding.

32. The rack of claim 20, wherein the supports include a pair of looped members.

33. The rack of claim 32, wherein each of the pair of looped members is affixed to one of the legs.

34. The rack of claim 32, wherein each of the pair of looped members is integrally formed with one of the legs.

35. The rack of claim 20, further comprising a stand for elevating the rack above a surface, wherein the stand includes a rod depending perpendicularly from the first end of at least one of the outer members.

36. The rack of claim 35, wherein the stand is affixed to at least one of the legs.

37. The rack 35, wherein the stand is integrally formed with at least one of the legs.

38. The rack of claim 35, wherein the stand further comprises a vertically-supported tube for receiving and supporting the perpendicular rod.

39. The rack of claim 20, wherein one of the legs contains a curved section having an angle of curvature that exceeds 180 degrees for holding a container.

40. The rack of claim 39, wherein the curved section has an angle of curvature that exceeds 300 degrees.

41. The rack of claim 39, wherein the curved section is affixed to the one leg.

42. The rack of claim 39, wherein the curved section is integrally formed with the one leg.

43. The rack of claim 42, wherein the one leg is substantially linear except for the curved section.

44. A substantially W-shaped rack for holding a container lid, the rack having four legs and being characterized by:
- the four legs include two outer legs and two inner legs, the two inner legs joined together at a proximal end of the rack and the outer legs joining adjacent inner legs at a distal end of the rack;
- each of the legs of the W-shaped rack are rod members having substantially the same length;
- the angles formed between adjacent legs of the W-shaped rack not exceeding 45 degrees, and
- a stand for supporting the rack in a substantially horizontal position above a surface, wherein the stand includes a rod depending perpendicularly from the proximal end of at least one of the legs.

45. The rack of claim 44, wherein the stand is affixed to at least one of the legs.

46. The rack of claim 44, wherein the stand includes a rod depending substantially perpendicularly from at least one of the legs.

47. The rack of claim 46, wherein the rod further comprises a vertically-supported tube for receiving and supporting the substantially perpendicular rod.

48. The rack of claim 47, further comprising a second rack for vertically supporting the tube.

* * * * *